Dec. 18, 1934.  H. E. TAUTZ  1,984,500
SCROLL SAW CHUCK
Filed June 7, 1933  3 Sheets-Sheet 1
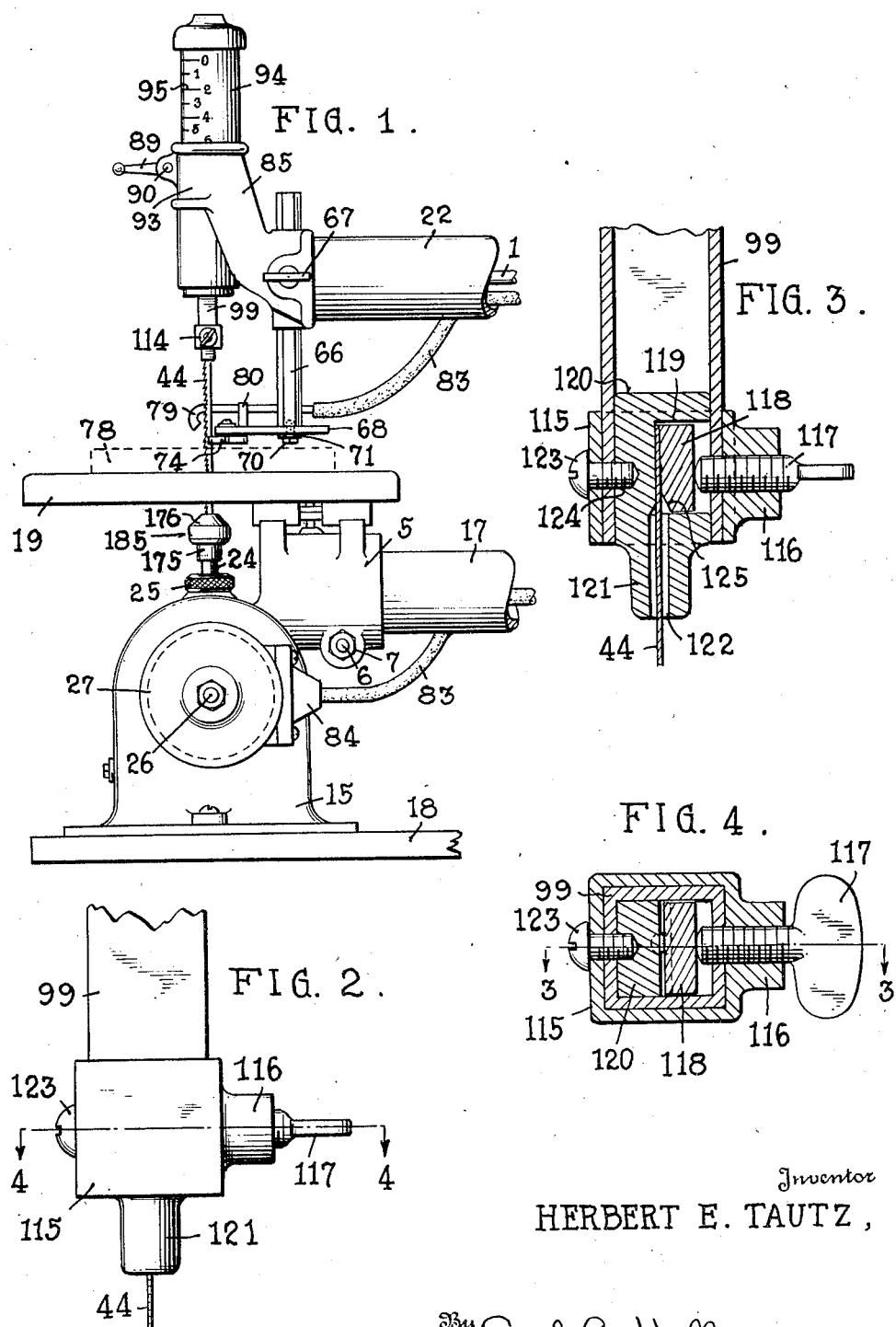
Inventor
HERBERT E. TAUTZ,
By Carl A. Hellmann,
Attorney

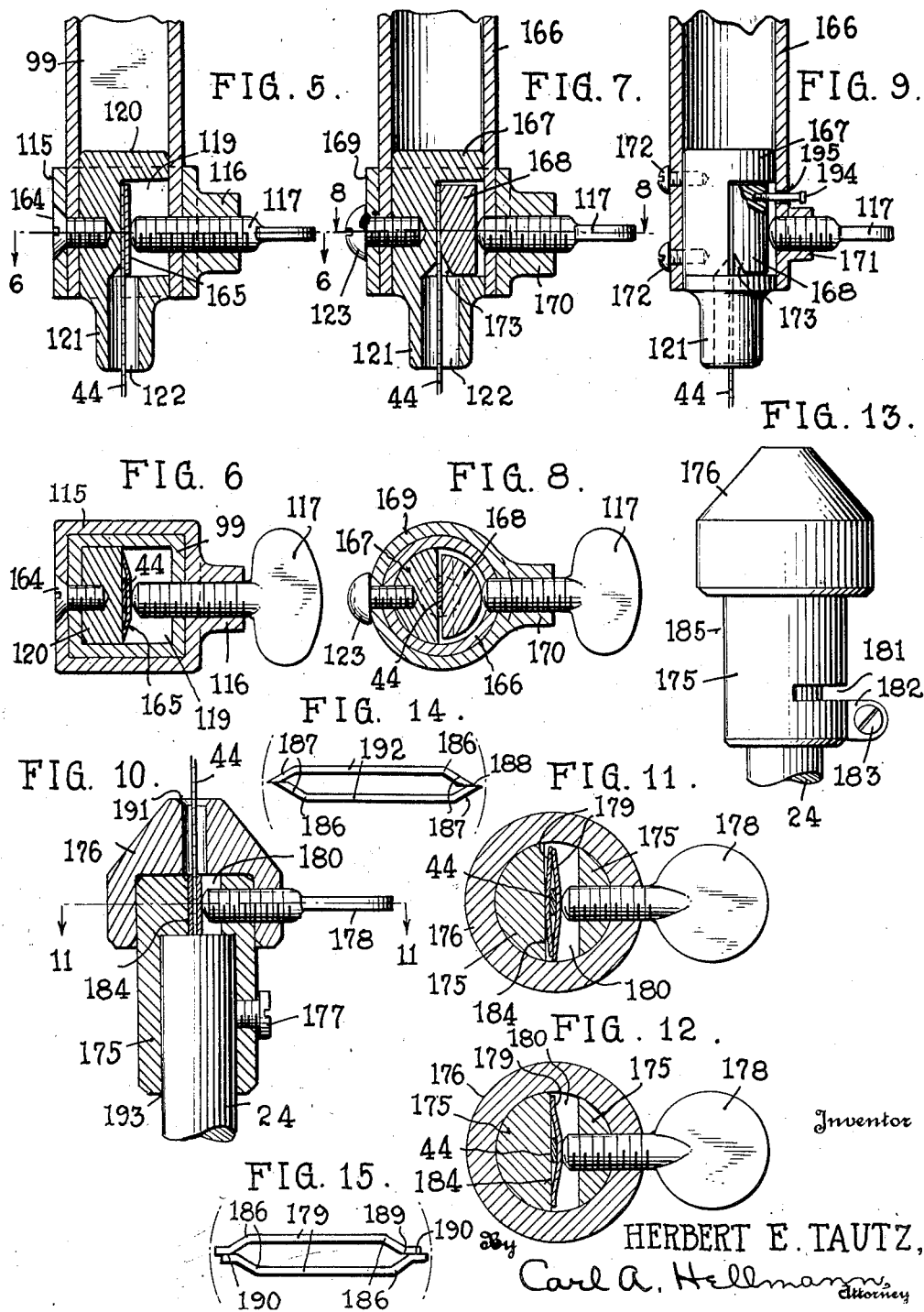

Dec. 18, 1934.   H. E. TAUTZ   1,984,500
SCROLL SAW CHUCK
Filed June 7, 1933   3 Sheets—Sheet 3

Inventor
HERBERT E. TAUTZ,
By Carl A. Hellmann,
Attorney

Patented Dec. 18, 1934

1,984,500

UNITED STATES PATENT OFFICE 1,984,500

SCROLL SAW CHUCK

Herbert E. Tautz, Milwaukee, Wis., assignor to Delta Manufacturing Company, Milwaukee, Wis.

Application June 7, 1933, Serial No. 674,748

13 Claims. (Cl. 279—44)

My invention relates to scroll saws.

More specifically it relates to improvements in the structure of the chucks of scroll saws, particularly adapted to cooperate with scroll saws of the type disclosed in my co-pending application Serial No. 669,587, filed May 5, 1933, although also of general application to other scroll saws and similar tools.

Still more specifically a feature of the present invention relates to a chuck particularly adapted for holding reciprocating tools, such as saw blades and the like.

A further object of the invention is to provide a tool-holding device or saw-chuck of this nature which, while extremely light in weight and simple in construction, is yet very rigid and rugged and will firmly hold any saws or the like clamped therein.

A further object is to provide a device of this general nature having two jaws, one of which is movable with respect to the other and is securely held against loss by being partly enclosed by the other.

Another object is to provide improved, simple and inexpensive means for securely but removably attaching the chuck to a reciprocating plunger of a scroll saw or the like.

Other objects and advantages of my invention will be evident from the various features set forth in the present specification and defined in the claims appended thereto.

For a clear understanding of my invention reference is to be had to the accompanying drawings, illustrative of several embodiments thereof.

Figure 16:
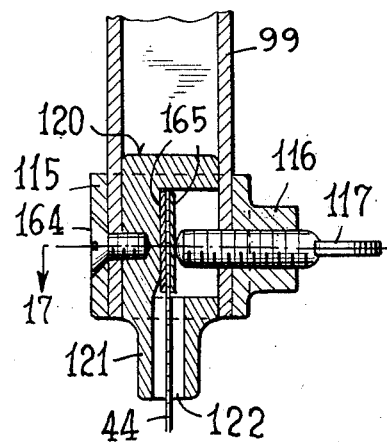
Figure 18:
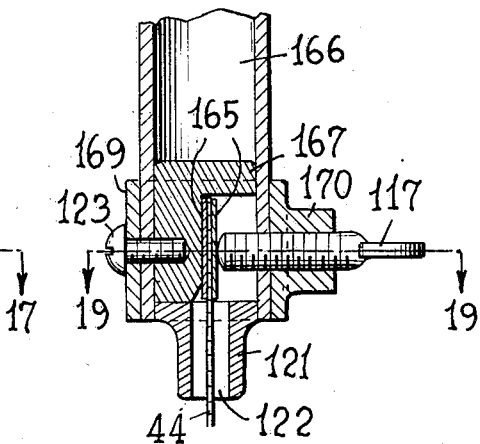
Figure 17:
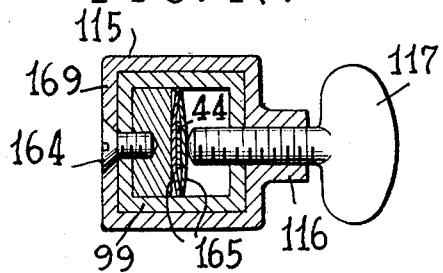
Figure 19:
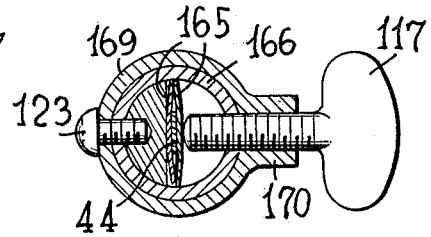
Figure 20:
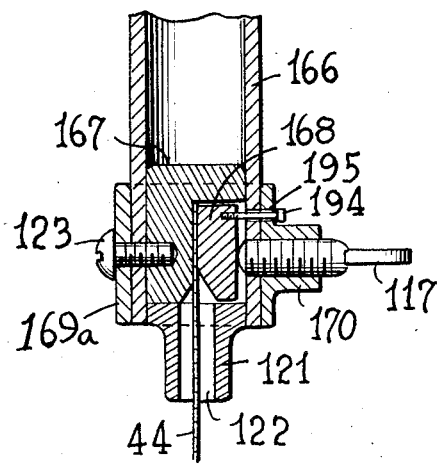
Figure 21:
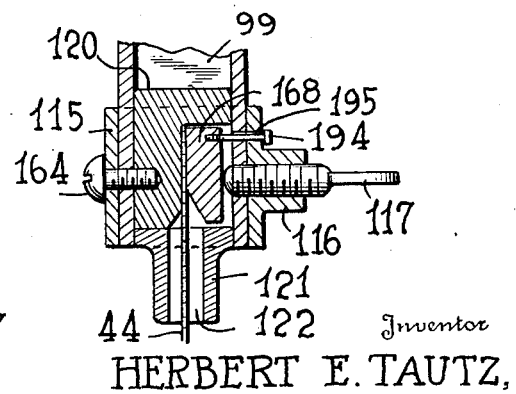

In said drawings:

Fig. 1 is a side elevation of a portion of a scroll saw embodying two forms of my improved chuck, cooperating therewith, to illustrate how the chucks are used in practice, preferably applied to a scroll saw, Fig. 2 is a side elevation, on an enlarged scale, of one of the chucks shown in Fig. 1, Fig. 3 is a vertical axial longitudinal section through the said chuck taken on the plane indicated by the line 3—3 of Fig. 4, Fig. 4 is a horizontal section through the chuck shown in Fig. 2, on the plane indicated by the line 4—4, looking in the direction of the arrows, Fig. 5 is a vertical axial longitudinal section through a modified form of chuck, Fig. 6 is a horizontal section through the chuck shown in Fig. 5 on the plane indicated by the line 6—6, Fig. 7 is another modification of the chuck, in vertical axial longitudinal section, Fig. 8 is a cross section of the chuck shown in Fig. 7, on the plane indicated by the line 8—8, Fig. 9 is a chuck similar to that shown in Figs. 7 and 8, indicated partly in central vertical longitudinal section and partly in elevation, but somewhat simpler than the Fig. 7 type, Fig. 10 is a central vertical longitudinal section through another form of chuck, Fig. 11 is a horizontal section through the chuck illustrated in Fig. 10, on the plane indicated by the line 11—11, Fig. 12 is a cross section of a slightly modified form of chuck, but which in general is similar to the form indicated in Figs. 10 and 11, Fig. 13 is an elevation of a chuck similar to that of Figs. 10–12, but having modified means for securing it to the operating plunger of the scroll saw, Fig. 14 illustrates diagrammatically certain features connected with the spring jaws of one form of chuck, Fig. 15 likewise diagrammatically shows a slightly different type of spring jaws, Figures 16 and 17 illustrate spring jaws, such as are illustrated diagrammatically in Figs. 14 and 15, embodied in a chuck similar to that shown in Figs. 3 and 4, Fig. 16 being a vertical axial section and Fig. 17 a horizontal cross section on the plane indicated by the line 17—17 of Fig. 16, Figures 18 and 19 illustrate a similar chuck embodied in a round tube instead of in a polygonal tube as in Figs. 16 and 17, Fig. 18 being a vertical axial section and Fig. 19 a cross section on the plane indicated by the line 19—19 of Fig. 18, Figure 20 is a vertical axial sectional view of a chuck similar to that shown in Fig. 9, but having a collar surrounding the cylindrical tube and Figure 21 is a vertical axial sectional view of a chuck similar to that shown in Fig. 20 except that it is embodied in a polygonal tube.

In the various figures similar parts are designated by the same reference characters.

Referring first to Fig. 1, there is illustrated a scroll saw embodying certain features of the invention, together with features of the older form of scroll saw, in order to show how the invention is to be used. In this figure, 15 designates a main drive housing which is fixedly secured to a suitable rear support or standard by means of the tubular arm 17, the housing 15 and the rear support being preferably mountable upon a suitable base, such as 18.

A work table 19 is secured to the drive housing 15 and is mounted to tilt thereon about an axis lying preferably in the upper surface of the table and in line with the saw blade. The work table is provided with a suitable opening for the passage of the saw blade, and with means for securing the said table in any desired adjusted position about its axis.

The housing or crank case 15 contains suitable operating mechanism for reciprocating the lower plunger 24 which is mounted slidably in the bushing 25 secured to the housing. The power for operating the said plunger is transmitted thereto through the crank shaft 26 by means of the pulley 27 which may be rotated by any suitable motor or other source of power. A suitable chuck designated generally as 185 cooperates with the plunger 24 to hold the lower end of a saw blade 44 in order to reciprocate said saw blade through the table.

An air pump 84 is also secured to the housing 15 and actuated by said shaft 26 to provide an air blast which passes through the flexible tube 83 into the tubular arm 17, said tube passing thence upward through the rear standard and back into the upper tubular arm 22, and finally terminating in a nozzle tube 79 adjustably secured in a support 80, to blow away the sawdust from the upper surface of the workpiece 78 resting upon the table 19.

The lower tubular member 17 may be secured to the housing 15 in any desired way, for example by being mounted in a suitable lug 5 secured to the housing 15 and split longitudinally at its lower part, in cooperation with a bolt 6 and nut 7 which will clamp the split lug 5 closely against the member 17. The tubular members 17 and 22 are secured to the rear standard in any desired manner, as shown for instance in my prior Patent No. 1,877,705.

A preferably polygonal rod 66, in the present case shown as hexagonal in cross section, has a bar 68 adjustably secured to its lower end, for example, by means of a bolt 70, a washer 71 being interposed between the bar and the head of the bolt. The support 80 for the nozzle 79 is also secured to this bar 68 in any desired manner and said bar 68 likewise supports adjustably the rotatable head 74 which has a series of slots at its periphery adapted to receive saw blades 44 of varying thicknesses and widths. All the features so far described are old and are already disclosed in the prior patent, above mentioned, and are described herein merely to illustrate how the improved features cooperate with the old structure.

Referring now to the head designated by reference character 85, in Fig. 1, it will be noted that this head takes the place of the head 23 disclosed in the prior patent, and is secured rigidly in position and in alinement by means of a rod 1 secured thereto, said rod extending through the tubular member 22 and being rigidly secured to the other end of said member and to the rear standard. The rod 66, already mentioned, passes through a suitably formed guideway in the head 85 and is secured at any desired elevation by means of the thumb screw or the like 67, shown in Fig. 1. It will be noted that the head 85 differs from the head 23 of the prior patent in that instead of extending in a generally horizontal direction as a continuation of the tube 22 it extends upward above said tube, as clearly shown in Fig. 1. It differs also from the former construction in that it is preferably split in front, and a bolt 90, having an operating lever 89 secured thereto, is threaded into one portion of said split part, while it passes freely through the other part so that the two parts may be drawn together or again released by proper manipulation of the arm 89. The tubular housing 94 contains a spring or other means for returning the plunger of the saw on its up stroke and a scale 95 for indicating the position of the housing and thereby the tension of the said spring. These features are disclosed and claimed in my copending application filed May 5, 1933, Serial No. 669,587, for Scroll saws, form no part of the present invention, and are mentioned herein only to complete the disclosure.

Referring now to Figs. 2, 3 and 4 it will be noted that the saw blade 44 is secured to the tubular member 99 by means of a chuck, which is indicated diagrammatically as a whole by 114, in Fig. 1 and shown in detail in Figs. 2, 3 and 4. Referring now to Figs. 3 and 4, it will be noted that the chuck comprises a polygonal element 115, in the case illustrated a square member or collar, and having a projection or lug 116, at one side thereof, through which is threaded a thumb screw 117. The threaded portion of this thumb screw passses through the square tubular member 99 and engages against a loosely mounted, preferably rectangular, block or jaw 118, located within the tube 99 and located also within a suitable cavity 119 formed in a cooperating jaw 120, as best shown in Fig. 3. The jaw 120 is formed to fit within the tube 99 and has a portion 121 extending beyond and below said tube 99, the portion 121 being preferably cylindrical externally and provided with a suitable slot or bore 122 to receive the saw blade 44. The outer member 115 and the jaw 120 are both secured firmly to the tube 99 by means of a suitable screw or the like 123, which passes freely through the member 115 and the tube 99 and is threaded into the jaw 120 as shown at 124. The jaw 118 has sufficient play within the cavity 119 to enable the blade 44 to be accommodated between the jaw 118 and the cooperating portion of the cavity 119 formed in the opposing jaw 120. In order to prevent the saw blade 44 from becoming caught upon the lower end of the jaw 118 when being inserted into the chuck, the said jaw 118 is preferably tapered at its lower portion, as shown at 125. It is obvious that the saw blade 44 may be clamped readily between the jaws or removed therefrom by merely tightening or loosening the thumb screw 117 and that the movable jaw 118 cannot become lost, because it is held within the cavity 119. This forms a chuck, which, while it is extremely light and simple and is delicate enough to hold very fine saw blades, is nevertheless rugged enough to likewise hold heavier blades or the like which are used for coarser work in the scroll saw art.

In Figs. 5 and 6 I show a modified form of chuck, many of the parts thereof, however, being the same as those used in the form just described. Here again there is a polygonal tube 99, shown as square in the present instance, which encloses a stationary or primary jaw 120 and which is surrounded by a collar 115 of a shape corresponding to the exterior of the tube 99. The jaw 120, tube 99 and collar 115 are removably secured to one another by a screw 164, here shown as a flat head screw, in place of the round head screw 123 of Fig. 3, this construction having certain advantages in some cases. As in the previous form, the collar 115 has a projecting lug 116 through which is threaded a thumb screw 117 which also passes through the wall of the tube 99 and enters into the cavity 119. Thus far the Fig. 5 form is substantially the same as that of Fig. 3, but in place of the secondary chuck jaw 118, which is a rigid or non-yielding element, I provide a resilient member or spring 165, against which bears the inner end of the thumb screw 117. The saw blade 44 passes through the bore or slot 122 in the cylindrical end 121 of the jaw 120 and enters between the spring 165 and the inner end of the cavity 119, so that upon tightening the thumb screw 117 the said saw blade will be firmly clamped between the spring 165 and the abutting portion of the inner wall of the cavity 119, but will be released automatically upon loosening the thumb screw 117 because of the bowing of the spring, which is pre-formed into a shallow bow shape, as shown in Fig. 6.

The form illustrated in Fig. 7 differs from the forms previously described in that the tubular member 166 is here shown as a circular cylindrical tube instead of a polygonal one and the primary or stationary chuck jaw 167, while of the same appearance in longitudinal section as the primary jaws in Figs. 3 and 5, is, however, of different cross section, namely, it is a circular cylindrical member instead of a member having a polygonal, or rather prismatic, outer configuration. The tubular member 166 is surrounded by a correspondingly shaped collar 169 having a lug 170 to receive the thumb screw 117, which is threaded through the same, and the collar, tube and primary jaw may be secured to one another by the screw 123, indentical with the corresponding screw in Fig. 3. The movable or secondary jaw 168 of this chuck is also similar in principle and in longitudinal section to that of Fig. 3, and has a corresponding tapered end 173 to prevent the saw blade from becoming caught, but differs from the Fig. 3 form in being of cylindrical outer contour, that is, it is approximately a semicircular cylinder. The parts 121, 122, and 44 are identical with those in the preceding figures.

Passing now to the Fig. 9 form, I show a still simpler modification of the chuck, wherein the collar used in the preceding forms and surrounding the tubular member is entirely dispensed with. Because of the thinness of the wall of the tube 166, in most cases, it is preferable to provide a plurality of securing means such as screws 172 to secure the primary jaw 167 in place in the tube 166 when no external collar is employed. Likewise the lug 171 may be provided on the tube 166 and secured thereto in any suitable manner, as by being formed integral with the said tube, or welded, soldered, or riveted thereto as may be found expedient. The parts designated by reference characters 44, 121, 167, 168 and 173 in Fig. 9 are identical with the corresponding parts in Fig. 7.

While the chucks above described are shown as having guides for the saw blades, it is, of course, obvious that where such guides would be undesirable they may be omitted. For example, the chuck illustrated in Fig. 3 has a guide 121 with a bore 122 to receive the saw blade. This will, of course, restrict the maximum size of saw blade which can be used in this chuck, but it is clear that if the guide 121 where removed, wider blades could be held in the chuck, up to the width of the interior of the tube 99, in fact. Fig. 9 shows one way this may be done, by making the guide 121 a separate piece, which may be held in the tube 166 by friction, that is, by being pressed into place, or by screw threads, etc., as preferred in any particular case. In order to keep the secondary jaw 168 from dropping out when the guide 121 is removed, a pin or the like, 194, secured to the jaw 168 and passing loosely through a suitable hole 195 in the tube 166, may be provided.

It is, of course, clear that this construction, whereby the guide 121 is made a separate and independent member, is not necessarily restricted to the Fig. 9 form of chuck, but that it may, in fact, be applied to any of the chucks disclosed in the present case. Indeed the chucks shown in Figs. 10–13 already embody this feature, because they all show a frusto-conical head 176 which may be removed without preventing the chucks from being used, if the threads to receive the shank of the thumb screw 178 are cut in the members 175 of the chucks shown in these figures, as will be clear upon referring to the detailed descriptions of the chucks in said figures. Inasmuch as these chucks are inverted with respect to those of Figs. 2–9, there is no danger that the spring jaws will fall out when the thumb screw is loosened.

All the structures of Figs. 2–9 and so far described, are particularly suitable for the upper chuck of a scroll saw or the like, for the reason that they are relatively simple, rugged, and inexpensive and may be made extremely light in weight, which is a highly desirable feature in a chuck which is moved entirely by power transmitted through the saw blade 44, especially when the speed of reciprocation is high and when the blade 44 is very delicate.

The chucks illustrated in Figs. 10–13, on the other hand are primarily intended to be employed on the lower or directly driven plunger 24 of the scroll saw, that is, these chucks are driven directly by the source of motive power through the mechanism contained in the crank case 15, of Fig. 1, and, therefore, it is not so important to make these of light weight, because no increased danger and strains in the saw blade 44 will be produced by an increase of weight of the said lower chuck. However, it should be clearly understood that while certain chucks are herein described as preferable for the upper plunger and certain others for the lower plunger, the utility of these chucks is not actually so limited and any of these chucks may be used interchangeably upon either plunger, if preferred, or if found expedient in any particular case.

Referring to the chuck illustrated in Figs. 10 and 11 it will be noted that this chuck comprises a tubular shank 175 suitably bored at 193 to admit into its interior the plunger 24, and having a screw or other suitable securing means 177 threaded through said tubular shank 175 and engaging the plunger 24 to removably secure said parts to one another.

At the upper portion of this member 175, I provide a slot 180, one surface 184 of which is substantially diametrally arranged, whereas the other side of the slot is displaced a considerable distance from the said diameter or central line. A preferably conical head 176 may be engaged over the upper end of the member 175, preferably by merely sliding it over the same and said parts 175 and 176 will be held in engagement by means of a thumb screw 178, passing through both and threaded into one of them. The conical head 176 has a bore or slot 191 provided therein to allow the saw blade 44 to pass through the said head and be engaged between two resilient elements 179 each of which is substantially the same as the spring 165, shown in Figs. 5 and 6. Both of these resilient members 179 are given a permanent set into substantially a bowed form, as best shown in Fig. 11, wherein, however, the degree of bowing is less than the maximum, because of the fact that the thumb screw 178 is there shown as clamping the saw blade 44 between the two spring jaws 179. Upon releasing the thumb screw 178, these jaws 179 will spring apart sufficiently to release the blade 44 which may then readily be withdrawn through the bore 191 in the head 176.

The form of chuck illustrated in Fig. 12 differs from that illustrated in Figs. 10 and 11, solely in providing a single bowed spring 179 instead of two such springs, and the saw blade is in that case clamped between one surface 184 of the slot 180 and the inner side of the single spring 179.

The form shown in Fig. 13 may have the internal structure shown in Fig. 10 and either Fig. 11 or Fig. 12, and in other respects differs from the Fig. 10 form only in the clamping means for securing the member 175 to the plunger 24. In the Fig. 13 form a slot 181 may be cut transversely, about halfway through the tubular member 175 and the portion below said slot may be provided with ears 182, parallel to and slightly spaced from one another, one of said ears 182 having an internal thread therein which is engaged by the screw 183 which passes freely through the other ear. Upon approaching the two ears 182 to one another by tightening the screw 183, it is obvious that the tubular member 175 will be securely clamped to the plunger 24.

A general difference between the chucks illustrated in Figs. 2-9 inclusive, on the one hand, and Figs. 10-13, on the other hand, is that the former type of chuck is shown as adapted to a tubular plunger and the latter type to a solid plunger, in the forms specifically illustrated. However, it is obvious that this is not an essential or important feature and that either type of chuck can readily be adapted to either the solid or hollow type of plunger by relatively immaterial changes and, therefore, no limitation of either type of chuck to the specific form shown is to be implied by the said specific illustrations.

Referring now to Fig. 14 I have shown diagrammatically one type of spring which may be used in the chuck. In this figure there are shown two identical springs 192, 192 in the position which they would assume, for example, if used in the chuck shown in Fig. 11. It will be noted that each of these springs, here shown, of course, in grossly exaggerated thickness for clearness of illustration, is bent at 186 to form a relatively short portion 187 at each end, serving to space the two springs 192, 192 apart from one another, as shown, when they are assembled with the ends 188 of the short sections 187 in contact with one another. The end faces 188 of these springs 192 may be cut at a slant to the remainder of the portions 187, so that the meeting surfaces 188 may be substantially parallel to the major portions of the springs, as illustrated. In such case there will be no tendency for one spring to slip off from the other, due to this parallelism. The dot and dash lines, forming circular arcs around the ends of the springs 192 of Fig. 14, designate, on a very much enlarged scale, the inner bore of the member 176, Fig. 10, and illustrate how the springs are positively kept from slipping off from one another at their ends due to proper choice of their size with respect to the said bore. This slanting of the ends 188 may in certain cases be found unnecessary, if the springs are fitted closely enough within the bores to prevent such sidewise slip and disengagement. The same effect may be secured by providing springs such as shown in Fig. 15. In this case the springs 179 have additional bends at their ends, that is, they are bent at 186, just as are the springs of Fig. 14, but bent again at 189 in the opposite direction, thus producing ends 190, which are parallel to the major portions of the springs. Here again the surfaces of contact are in a plane parallel to the major portions of the springs 179, 179 and, therefore, there is no tendency for one to slip off of the other. It will be clearly understood, however, that these special shapes of springs are refinements which may be found unnecessary in many cases and, therefore, the springs actually used in the chucks need not in all cases be made as elaborately as those just described and any spring having a slight bow of sufficient amount at the central portion may in many cases be found satisfactory regardless of the actual shape of the said bow and whether or not it is made of straight or curved portions.

Referring now to Figs. 16 and 17, it will be noted that the structure disclosed in said figures is very similar to that of Figs. 3 and 4. The polygonal tubular member 99 surrounds the major portion of the stationary jaw 120. A collar 115 surrounds the tube 99 near its lower end and a suitable fastening means, such as a single screw 164, passes through the collar 115, and a wall of the tube 99 and into the stationary jaw 120, whereby said three elements may be firmly secured to one another. The clamping screw 117 is threaded through a suitable boss 116 provided on the collar 115 and the inner end of said clamping screw may bear against a spring jaw 165, as clearly shown in Figs. 16 and 17. Two such spring jaws are illustrated, arranged with their hollow or concave sides facing each other, whereby a saw blade or the like 44 may be secured between said spring jaws by suitably tightening the clamping screw 117. The spring jaws are located in a recess of the stationary jaw 120 whereby they are prevented from dropping out and the jaw 120 may be provided with a tubular extension 121 having a suitable bore 122 to receive and guide the saw blade 44 into proper position between the spring jaws 165, when said jaws expand due to their own resilience, upon loosening the clamping device 117.

Figs. 18 and 19 illustrate a similar structure, the chief differences being that a cylindrical tube 166 takes the place of the polygonal tube 99, the jaw 167 being made in two parts, that is, the upper portion which is held in position in the tube 166 by means of the screw 123 passing through the external collar 169 which surrounds the tube 166, and the lower portion 121 which is tubular and has a bore 122 serving to receive and guide the saw blade 44, but which is held in the tube 166 merely by friction, by being forced into the tube, preferably into contact with the lower surface of the stationary jaw 167. Here again two spring jaws 165 are provided, cooperating with a clamping screw 117 passing through the threaded lug 170 on the collar 169. Fig. 20 shows a further modified form similar to that shown in Fig. 9, but differing therefrom in that a collar 169a is provided surrounding the cylindrical tube 166, whereas in Fig. 9 no such external collar is present. As a result the clamping screw 117 is threaded through the jaws or lug 170 formed on the collar 169a, instead of being threaded directly through a lug formed integral with the tube 166 as in Fig. 9. The remaining features of Fig. 20 are identical with those shown in Fig. 9.

Fig. 21 illustrates a further modified form of chuck as applied to a polygonal tube 99, but is similar in other respects to Fig. 20. The stationary jaw 120 is held in the tube 99 by means of the screw 164, which passes through the external collar 115 and engages in the said jaw 120. In both Figs. 20 and 21 the guide 121 is preferably made as an element separate from the stationary jaw 120 or 167 respectively and is held frictionally just as in the Fig. 9 form.

The operation of the various types of chucks is as follows:

The operation of the Fig. 2 form of chuck is believed to be obvious from Figs. 2, 3 and 4. In order to insert a blade such as 44 it is necessary merely to pass the same inward through the slot or bore 122 in the jaw 120 until it has been entered sufficiently to be positioned between the primary jaw 120 and the cooperating or secondary jaw 118, whereupon the thumb screw 117 is tightened sufficiently to secure the blade 44 firmly in position in the chuck.

It will be obvious that by adopting the construction embodied in the present invention the weight of the chuck may be minimized as far as possible. It will be noted that the tubular member 99 is preferably of relatively small size and preferably is made as thin-walled as possible, consistent with retaining sufficient strength for the purpose in view, and that the upper chuck 114 is made as small and light as possible. Preferably, in constructing the upper chuck, such materials will be selected as will provide a minimum of weight with a maximum of strength, for example, aluminum or magnesium, or alloys thereof, for example magnalium, etc., although other materials, such as steel, brass, etc., may be used, if desired. Lightness of the upper chuck is a point of great importance in the operation of scroll saws, particularly when delicate blades are used, because the stresses produced in the saw blade due to the inertia of the movable upper plunger member, comprising the tube 99, chuck 114, etc., become excessive at the extremely desirable high speeds of operation of such saw blades and such high speeds are made possible only by restricting said inertia to the greatest possible extent concomitant with retaining sufficient strength of the plunger. High speeds are desirable to insure smoothness of cut and permit greater cutting speed of the blade, and smoothness of cut is a particularly desirable feature when small blades are used, such as jeweler's blades or "puzzle" blades.

The operation of the chuck shown in Figs. 5 and 6 will be obvious from the description and drawings of the same. In this chuck, which is very similar to the Fig. 3 type, the chief difference resides in eliminating a massive movable or secondary jaw and substituting a single bowed spring 165 in place of the same and in substituting a flat head screw 164 for the round head screw 123, of the Fig. 3 type. Both of these changes eliminate some of the weight of the structure and are, therefore, advantageous in this respect among others. Furthermore, the spring 165, when released by the thumb screw 117 will spring back far enough to allow the saw blade 44 to be inserted between the said spring 165 and the rear face of the cavity 119 of the primary jaw 120 so that the said saw blade 44 may be clamped between said spring secondary jaw 165 and the co-acting portion of the primary jaw 120 by again tightening the thumb screw 117.

It will also be noted that while I have specifically shown in these figures only a single spring jaw 165, a pair of such jaws may readily be substituted for the same, as clearly shown in Fig. 11, and in fact the same chuck may at the option of the user be employed in both ways or even with a rigid secondary jaw, thus providing, in fact, three ways. If each of the two spring jaws has the same amount of bow thereto, then in certain cases, the two spring jaws might be used for holding between them saws with a certain range of thicknesses while the single spring jaw 165 could be used for blades of a different range of thicknesses. The showing of Figs. 5 and 6 should, therefore, not be held to limit the invention to the specific single spring jaw illustrated.

The operation of the chucks illustrated in Figs. 16 to 19 will be clear from the illustrations. This operation is substantially the same as that of the chucks illustrated in Figs. 5 and 6 with the exception that two springs 165 are provided, to receive the saw blade 44 between them.

The operation of the form shown in Figs. 7 and 8 is identical with that of the Fig. 3 type, in fact practically the only difference between the Fig. 3 type and the Fig. 7 type is that the Fig. 3 type has a polygonal tube 99 and a polygonal collar and correspondingly shaped jaw structures cooperating therewith, whereas in the Fig. 7 type these are all circular or cylindrical instead of polygonal.

The Fig. 9 form is substantially the same in operation as the Fig. 7 form and its chief advantage resides in the further elimination of weight secured by eliminating the collar 169 entirely. This form may be still further simplified and also cheapened, but with the sacrifie of certain advantages, by securing the primary jaw 167 to the tube 166, by soldering, riveting, welding, etc., instead of by screws or other removable fasteners, the chief disadvantage being that where such permanent attachment of the primary jaw and the tube 166 is employed the said jaw 167 is no longer removable and, therefore, the interior of the chuck will in such cases be relatively inaccessible for purposes of cleaning or removing any accidentally broken parts therefrom.

The operation of the forms of chuck illustrated in Figs. 20 and 21 is similar to that of the chuck shown in Fig. 9, said figures differing from Fig. 9 only in providing an external collar surrounding the tube which contains the stationary jaw. The operation of these chucks is, therefore, believed to be obvious from the illustration in connection with the above description of the operation of the Fig. 9 form.

The operation of the form of chuck illustrated in Figs. 10, 11 and 12, will likewise be clear from the illustrations. These chucks, whether they have a single spring jaw 179 or a pair of spring jaws 179, 179, as shown specifically in the cross sections, operate in substantially the same way as the form already described above with reference to Figs. 5 and 6. It is obvious also that secondary jaws like 118 of Figs. 3 and 4 may be used therein in place of the spring jaw or jaws. The tubular portion 175 of the chuck will fit over the end of the plunger 24, as shown in Figs. 1 and 10, to secure the chuck in proper position and the chuck may then be tightened in such position by means of the screw 177 threaded through the tubular portion 175 and engaging against or even into the plunger 24. The conical head 176 of the chuck, having the bore 191 therein, will serve to properly guide the saw blade 44 into position between the two spring jaws 179, 179, or between the single spring jaw 179 and the surface 184 of the slot 180 as the case may be and by proper manipulation of the thumb screw 178 the saw blade 44 may be clamped or released as desired.

The operation of the Fig. 13 form of chuck is identical with that of the Figs. 10, 11 and 12 form as to all the internal structure of the chuck proper and the only difference between this form and the other said forms resides in substituting the slotted portion 181 and the ears 182, 182 of the Fig. 13 form, together with the screw 183, in place of the screw 177 of the Fig. 10 form. This is a construction which may be found preferable in certain cases and which provides a very firm grip of the tubular member 175 upon the reciprocating plunger 24.

Inasmuch as the lowness of weight or inertia of the lower plunger and lower chuck carried thereby, are not of as extreme importance as the corresponding weight of the upper chuck and plunger, for the reason that the lower members are moved directly and positively by the motor driven operating mechanism in the crank case 15, this lower chuck and the plunger 24 may be made wholly of steel, in contradistinction to the upper chuck which is preferably made of suitable light metal. However, if for any reason the same structure as that of Figs. 10-13, is to be used for an upper chuck, this may be done by making all the massive parts thereof of light metal instead of using steel and conversely if it is desired to employ the structural details of the chucks shown in Figs. 2-9 inclusive or Figs. 16 to 21 inclusive, in lower chucks instead of upper ones the inverse change may be made, if desired, that is, steel or other suitable heavy metal may be substituted for the light metal originally disclosed for use in the upper assembly. The governing principle, of course, is that inasmuch as the upper chuck and plunger are actuated entirely by forces transmitted through the saw blade 44, and said saw blade 44 is in many cases very delicate, the said blade will be unduly strained and prone to premature breakage if the mass, and consequently inertia, of the parts actuated thereby are excessive in proportion to the strength of the said saw blade.

Certain features disclosed, but not claimed, in the present case, are claimed in the copending divisional application for Scroll saw chucks, Serial No. 692,869, filed October 19, 1933.

Having described my invention and disclosed several modifications thereof, it will be understood that the inventive ideas may be embodied in still further modifications besides those disclosed herein and, therefore, for an understanding of the invention reference is to be had to the following claims.

I claim:

1. A saw-holding chuck for a scroll saw, comprising a tubular member, a primary jaw fitting within the same, means for securing it to said member, said jaw having a lateral recess therein, both ends of said recess lying within the said member, a secondary jaw movably arranged in said recess, thus preventing its escape from the tubular member and means cooperating with the tubular member for forcing one of said jaws against the other.

2. A saw-holding chuck for a scroll saw, comprising a tubular member, a primary jaw fitting within the same, releasable means for securing it to said member, said jaw having a lateral recess therein, both ends of said recess lying within the said member, a secondary jaw movably arranged in said recess, thus preventing its inadvertent escape from the tubular member and means cooperating with the tubular member for forcing one of said jaws against the other.

3. A saw-holding chuck for a scroll saw, comprising a tubular member, said member having a reenforcement near its end, a primary jaw fitting within the said tubular member, means for securing said jaw to said member at its reenforced portion, said jaw having a lateral recess therein, both ends of said recess lying within the said member, a secondary jaw movably arranged in said recess, thus preventing its escape from the tubular member and means cooperating with the reenforced portion of the tubular member for forcing one of said jaws against the other.

4. A saw-holding chuck for a scroll saw, comprising a tubular member, a collar enclosing the same, a primary jaw fitting within said tubular member, said jaw having a portion thereof cut away, a cooperating secondary jaw fitting within the cavity thus provided, means for securing the collar and the primary chuck jaw to the tubular member and an adjustable means for forcing one chuck jaw against the other.

5. A saw-holding chuck for a scroll saw, comprising a tubular member of polygonal cross section, a collar of corresponding shape enclosing the same, a primary jaw fitting within said tubular member, said jaw having a portion thereof cut away, a cooperating secondary jaw inserted within the cavity thus provided, means for securing the collar and the primary chuck jaw to the tubular member, and an adjustable screw, threaded in the collar, for forcing one chuck jaw against the other.

6. A saw-holding chuck for a scroll saw, comprising a tubular member of polygonal cross section, a collar of corresponding shape enclosing the same, a primary jaw fitting within said tubular member, said jaw having a portion thereof cut away, a cooperating secondary jaw inserted within the cavity thus provided, means for securing the collar and the primary chuck jaw to the tubular member, and an adjustable screw, threaded in the collar, for forcing one chuck jaw against the other, the primary jaw having a saw-receiving portion extending beyond the tubular member, and having an opening in said portion to allow the saw blade to pass therethrough.

7. A saw-holding chuck for a scroll saw, comprising a tubular member, a primary jaw fitting within the same, means for securing it to said member, said jaw having a lateral recess therein, both ends of said recess lying within the said member, a secondary jaw movably arranged in said recess, said primary jaw having therein a longitudinal passage allowing a saw blade to be inserted therethrough, said passage leading to the recess, whereby said saw blade will be automatically guided into a position between the jaws, and means cooperating with the tubular member for forcing one of said jaws against the other.

8. A saw-holding chuck for a scroll saw, comprising a tubular member, a primary jaw fitting within the same, means for securing it to said member, said jaw having a recess therein, a secondary jaw movably arranged in said recess, said primary jaw having therein a longitudinal passage allowing a saw blade to be inserted therethrough, said passage leading to the recess, whereby said saw blade will be automatically guided into a position between the jaws, the secondary jaw having a portion cut away at an angle, adjacent the said passage, to prevent the saw blade from becoming caught on the said jaw when being inserted into the chuck, and means cooperating with the tubular member for forcing one of said jaws against the other.

9. A saw-holding chuck for a scroll saw, comprising a tubular member, a primary jaw fitting within and secured to said member, said jaw having a recess therein, a pair of resilient secondary jaws arranged in said recess, thus preventing their escape from the tubular member and means cooperating with the tubular member for forcing one of said secondary jaws toward the other.

10. A saw-holding chuck for a scroll saw comprising a tubular member, a collar enclosing the same, a primary jaw within said tubular member, a cooperating secondary jaw, a single means for securing the collar and the primary chuck jaw to the tubular member, and an adjustable means for forcing one chuck jaw against the other.

11. A saw-holding chuck for a scroll saw comprising a tubular member, a collar enclosing the same, a primary jaw within said tubular member, a cooperating secondary jaw, a pin secured to the secondary jaw, the tubular member having an aperture through which said pin passes loosely, means for securing the collar and the primary chuck jaw to the tubular member and an adjustable means for forcing one chuck jaw against the other.

12. A saw-holding chuck for a scroll saw comprising a tubular member, a collar enclosing the same a primary jaw within said tubular member, a cooperating secondary jaw, means for preventing the said secondary jaw from becoming lost, said means comprising an element engaging the jaw and the tubular member, means for securing the collar and the primary chuck jaw to the tubular member and an adjustable means for forcing one chuck jaw against the other.

13. A saw-holding chuck for a scroll saw comprising a tubular member, a collar enclosing the same, a primary jaw within said tubular member, a cooperating secondary jaw, means for securing the collar and the primary chuck jaw to the tubular member, an adjustable means for forcing one chuck jaw against the other and a saw guide removably secured to the tubular member.

HERBERT E. TAUTZ.